April 21, 1931. W. DUBILIER 1,802,077
INDICATING DEVICE FOR HIGH FREQUENCY CURRENTS
Original Filed Oct. 8, 1925
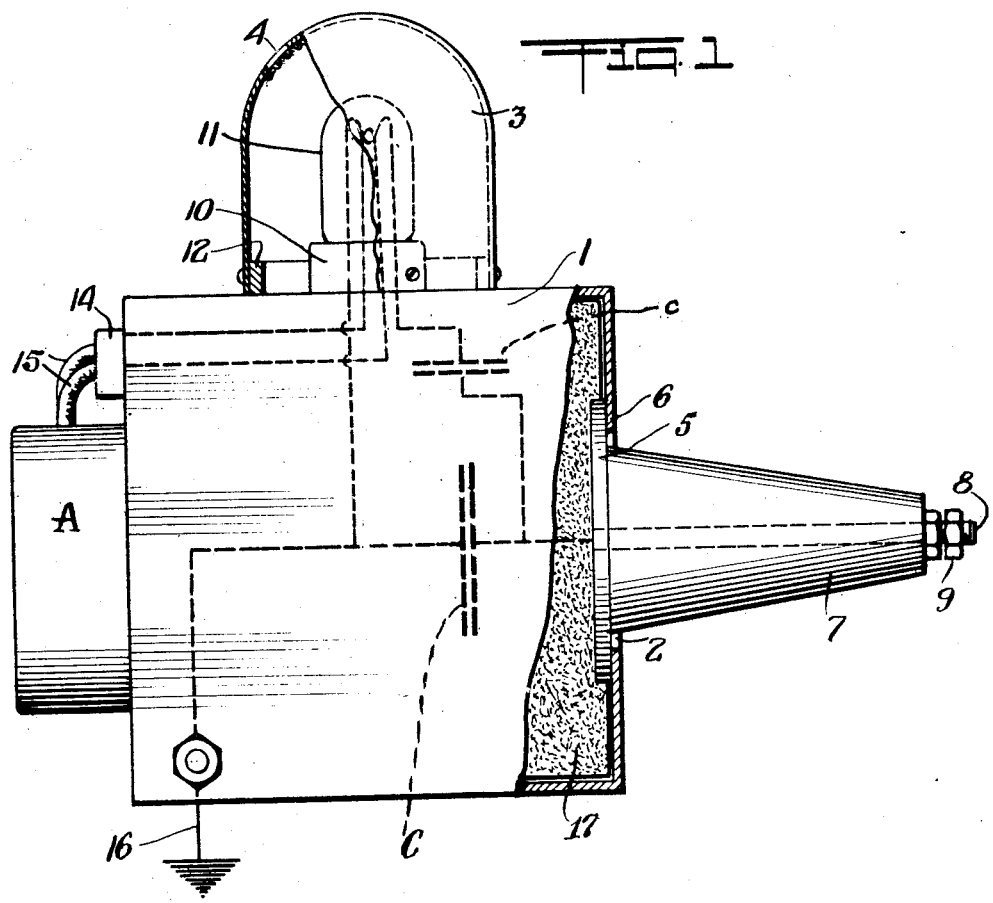
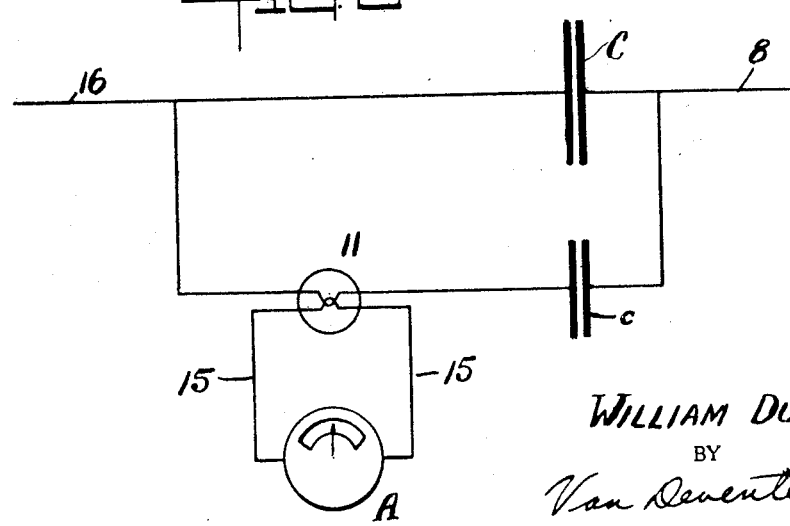
INVENTOR
WILLIAM DUBILIER
BY
Van Deventer Nickel
ATTORNEYS Patented Apr. 21, 1931

1,802,077

UNITED STATES PATENT OFFICE

WILLIAM DUBILIER, OF NEW ROCHELLE, NEW YORK, ASSIGNOR TO DUBILIER CONDENSER CORPORATION, OF NEW YORK, N. Y., A CORPORATION OF DELAWARE

INDICATING DEVICE FOR HIGH-FREQUENCY CURRENTS

Application filed October 8, 1925, Serial No. 61,377. Renewed August 29, 1930.

This invention relates to instruments or devices for indicating or measuring oscillating electric currents of radio frequencies; and in particular to an improved device for indicating or measuring high frequency electric currents of large value, such as are frequently produced in the operation of powerful radio transmitting plants, and other kinds of electrical apparatus.

An object of my invention is to provide for the accurate measurement of the effective high frequency current flowing in the oscillating circuit of a continuous wave electrical oscillator of high power. Another object of my invention is the provision of means for the indication of heavy high-frequency continuous wave currents, that exhibit substantially no change in calibration when changes in the frequency of the radio frequency currents occur.

A further object is to provide a high frequency current indicator of simple and compact structure, with accurately calibrated scale, and especially protected against the disturbing influences of adjacent stray capacities.

Still another object of my invention is to provide in an indicator of heavy radio frequency currents, a combination of parts that will exhibit practically no tendency to over heating.

These and other objects and advantages of my invention will appear from the following detailed description taken with the accompanying drawings, which show, for the purpose of illustration, one form of my invention; but of course I do not wish to be limited to the specific details of structure set forth therein, as I wish my invention to be construed as broadly as it is expressed and defined in the appended claims; and I reserve the right to vary the necessary elements composing my invention in their construction, proportion and arrangement to the full extent which the nature and scope of the invention permit, or the practice of invention may require.

In the accompanying drawings:—

Figure 1 is a partly cut away vertical front view of a device according to my invention showing the general form of the housing employed and the arrangement of certain of the constituent parts upon the exterior of the casing; and Figure 2 is a schematic wiring plan of the connections employed in my indicator.

Like figures of reference denote the same parts wherever they are shown.

It is well known that for the measurement of large electric currents, the usual practice is to use some form of ammeter. In order to avoid the passage of large currents through the moving portion of the instrument some form of shunt is employed. In the measurement of alternating currents of radio-frequency, however, it is a familiar dictum that ammeters must not be shunted, since usually the inductances of the instrument and of the connected shunt are in a different ratio from that of the resistances, and hence the current distribution will vary with the frequency. Serious errors of indication may thus occur and the use of shunts of large carrying capacity should be avoided. To obviate the use of shunted instruments it has been customary in high frequency measurements to employ hot wire instruments consisting of numerous parallel heating elements each supposed to carry equal portions of the heavy current. In reality such an ammeter is only a variety of shunted instrument and hence it is difficult to make these ammeters accurate at radio-frequencies. Also errors due to differences in the resistances of the individual wires and strips employed in such ammeters may often be quite material. Further, these thermal instruments almost invariably show a zero shift which is not only undesirable, but often troublesome in making accurate measurements, even when the meter is provided with a so-called zero-adjustment.

Since shunts of the ordinary type cannot be used in the accurate measurement of large currents at radio frequencies, the employment of current transformers, with or without iron cores, in conjunction with suitable specially calibrated indicating instruments, has been much in vogue. A full discussion, however, of the merits and demerits of the better type of instrument would be beyond the scope of this specification and it is sufficient to state, that while for certain purposes and under special conditions, these instruments possess on the one hand certain advantages such as: simplicity of construction, small inductance and capacity of their primary turns, and complete insulation of the indicating circuit from the main circuit etc. On the other hand they frequently overheat and catch fire and exhibit certain other defects at various frequencies.

To obviate the above narrated disadvantages and to impart greater reliability and constancy of action to my improved indicating meter for large high frequency currents, I employ the combination of elements described below in full.

Figure 1 shows a vertical side view of a casing, preferably of light metal or of other suitable material, lined with conductive metal foil, within and upon which the several elements of the apparatus are mounted securely. In the back wall of the metal casing is an aperture 2, closed by a thick sheet of mica, 5, bearing an attached sleeve or pillar, 7, of insulation which surrounds and supports the conducting stem, 8, provided with a thread for fastening nuts 9.

On the top of casing 1, a socket 10 adapted to receive a vacuum bulb thermo-element, 11, is located. Projecting from the outer surface of the metal top, a circular rib or ring, 12, encircles the socket, and serves to maintain in position the dome shaped cover, 3, for the element 11. As a function of this cover is to protect the enclosed element 11, from the effects of stray electrostatic capacity fields, it is made of metal and provided with a suitable peep hole, 4, over which is a piece of metal gauze or wire mesh. Its presence also prevents excesive circulation of cooling air about the bulb and thus stabilizes the radiation, although sufficient radiation is allowed to avoid overheating of the thermo junction in the element 11. Meter A is fixed upon the front of the casing and is thus screened from the highly charged elements within the container 1. Wires 15 attached to the terminals of this ammeter pass through insulator bushings 14, and connect with the proper terminals on the socket bearing the thermo-couple bulb, 11.

The casing 1 is provided at 16, or elsewhere if desired, with a binding post for earthing the entire casing.

Within the casing 1, securely fixed and embedded in high grade insulating wax, 17, are two condensers, shown at C and c in Figure 2. The capacity of C is many times that of c. Both condensers are composed of specially selected material, preferably, high grade mica. Any losses occurring in them at radio-frequencies must be exceedingly minute. In Figure 2, the plan of the connections of the various parts of the instrument is shown diagrammatically. It is as follows: Condenser C of large capacity in the casing 1, has one of its terminals connected to the high potential terminal 8, which is joined to one of the leads of the oscillating circuit including, antenna test apparatus etc. The other terminal of the condenser C is attached to casing 1, which is earthed or grounded. The condenser C is thus the series condenser. The small condenser c of much less capacity than C, is connected in series with the thermo-element 11, and both are in shunt across the terminals of the large condenser C. The ammeter A is then connected to the terminals of the thermo-element in the tube 11. When the condensers are connected in the aforesaid manner and to the outside oscilating circuits, the large radio frequency current will divide between the two branch circuits formed by the electrical appliances or the condensers C and c. In general the intensity of current traversing each branch will depend upon the capacities of the condensers, and particularly so, where precautions have been taken in the choice of the material composing the condensers in their construction and in the design of their mounting, so that only negligible variations of their equivalent resistances occur with varying high frequencies. For example; if the capacity of the large series condenser C be about .099 mfd. and sufficient power be used to force an effective current of 100 amperes through the combined condensers, the capacity of the shunting condenser c may be only .001 mfd. Ample current would thus traverse the non-inductive thermo-element and generate enough E. M. F. to produce a large deflection of the index pointer (not shown) of the calibrated indicating meter A. Hence when known ratios of condensers of accurate capacity are used multiplication of the scale indications by the calculated multiplier to obtain a true reading is a very simple matter.

In the combination as herein described the inclusion of a thermo-element connected in series with the shunting condenser c, has been especially emphasized; since, owing to its use particular advantageous and novel effects as regards the stabilization of the resistance of the shunt circuit with respect to various radio frequencies are produced. It is apparent that indications, at least of a kind, may be obtained by connecting a sufficiently sensitive high frequency ammeter of the usual type in the place of the thermo-element, the meter thus being in series with the small shunting condenser. But considerable changes in the inductance, resistance, and capacity of the conductive elements of the meter and its connecting leads would usually occur upon variations in the frequency of the radio current. The proportionality of the current through the shunting condenser $c$, would vary therefore with the different frequencies and the resultant deflections of the meter would not be truly indicative of the total actual current. Employment of a thermo-couple with its short leads of small capacity and inductance and resistance tending to vary but little with changes of frequency minimizes the above described causes of uncertainty and markedly stabilizes the responsive amounts of the currents that exist in the two branches containing the condenser C, and the condenser C and thermo-element 11 at various radio-frequencies within reasonable limits. Accurate indication of the current in the shunt circuit is thus secured.

While I have shown and described the preferred embodiment of my invention it is to be understood that I do not confine myself to the precise details of that particular assembly and construction as herein set forth by way of illustration, as it is apparent that many variations may be made therein by those skilled in the art without exceeding the limits of the invention, especially in mechanical construction of the device.

Having described my invention what I believe to be new and desire to secure and protect by Letters Patent of the United States is:—

1. An indicating device comprising a container, electrical appliances therein, a measuring instrument, an element mounted on the exterior of the container and connected to said appliances and said instrument, and a cover having a screened opening secured to the outside of the container over said element.

2. An indicating device comprising a container having electrical appliances therein, an element on the exterior of the container, and connected to said appliances, a cover for said element, said cover having a screened opening, and a measuring instrument secured to the exterior of the container and connected to said appliances and to said element.

3. The combination of a metallic container, a condenser in said container, a second condenser of smaller capacity in the container, a thermo element, and a measuring instrument on the outside of the container, said element and said condenser of smaller capacity being in parallel with the first-named condenser, and the measuring instrument being connected to afford readings of the current passing through the condenser of smaller capacity and the thermo element, and a cover with a screened opening, on the outside of the casing, for said element.

4. An indicating device for measuring electrical quantities, comprising an electrical impedance element, means for connecting the same with an external circuit, a shunt circuit connected to the impedance element, said shunt circuit comprising a second impedance element and an element for generating currents in accordance with the electrical quantities present in the external circuit, and a cover for said generating element for screening the same from external electric fields.

5. An indicating device for measuring electrical quantities, comprising an electrical impedance element, means for connecting the same with an external circuit, a shunt circuit connected to the impedance element, said shunt circuit comprising a second impedance element and an element for generating currents in accordance with the electrical quantities present in the external circuit, and a metallic screen within the device and a metallic cover for said generating element for screening the elements from stray electric fields.

6. An indicating device for measuring electrical quantities, comprising a condenser of relatively large capacity, a circuit connected in parallel with said condenser, the latter circuit comprising a condenser of relatively small capacity and a thermocouple in series relation, and a metallic cover having a screened opening enclosing said thermocouple and screening the latter from external electric fields.

In testimony whereof I affix my signature.

WILLIAM DUBILIER.